2,867,607

RESINOUS COMPOSITIONS

Yun Jen, Stamford, Conn., assignor to American Cyanamid Company, New York, N. Y., a corporation of Maine No Drawing. Application September 23, 1957
Serial No. 685,418

8 Claims. (Cl. 260—69)

This invention relates to methods of making high molecular weight polymers and to the products thereof. Further, the present invention relates to high molecular weight, water-soluble, cationic aldehyde condensates of extralinear polyurea compositions. More specifically, this invention relates to methods for preparing novel resinous compositions of matter from formaldehyde, a diacrylamido compound, an alkali metal cyanate and a polyamine.

In the process of my invention a series of sequential procedural steps is followed, wherein a polyamine and a diacrylamido compound are initially reacted to form a high molecular weight linear polymer which may be illustratively designated for the purpose of this invention as a backbone polymer. This resinous backbone structure or polymer is thereupon reacted with an acid so as to form the substantially complete salt of said polymer. Next, the salt is reacted with an ureido radical forming compound such as potassium cyanate or potassium thiocyanate, to yield an extralinear polyamide. The designation extralinear polyamide contemplates the polymeric structure having repeated

groupings as opposed to the conventionally thought-of polyamides having repeated

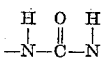

groupings. The extralinear polyurea thus formed is then condensed with an aldehyde so as to yield resinous compositions, constituting the ultimate products of my invention. These novel final resinous materials are water-soluble and cationic in nature, possessing utility in the treatment of textiles, cellophane, and the like. These novel resinous compositions may also be employed in molding and laminating operations and may also be used for sizing glass fibers. They may also be used as base coatings which, when applied to various types of substrates, serve as primers or anchoring agents for subsequently applied protective or decorative coatings. These compositions are also useful in the field of adhesives.

It is an object of this invention to produce a novel class of resinous compositions. It is a further object of this invention to produce novel resinous compositions by a defined series of procedural steps. These and other objects of this invention will be discussed more fully hereinbelow.

The overall process for the preparation of the novel resinous compositions of my invention comprises four principal procedural steps.

In the first step, high molecular weight stable water-soluble linear polymers are obtained by reacting a diacrylamido compound and a polyamine which forms the backbone for subsequent operations.

The proportions of the diacrylamido compound to the polyamine may be varied over a wide range. Generally the molar ratio of the diacrylamido compound or bis acrylamido compound, as it is more conventionally designated, to polyamine is maintained within the ratio of 0.5:1 to 3:1 and preferably from about 0.7:1 to 2:1. Quite obviously the polymeric length achieved in the reaction of the bis acrylamido with the polyamine is fundamentally a function of the molar quantities of the respective reactants as well as the number of functional groups of the reactants existing in the reaction mixture. In other words, where one employs a low mol ratio of bis acrylamido to diamine, e. g., about 0.6, a rather low molecular weight polymer is obtained. Conversely, when one employs mol ratios of these respective reactants in the order of 1.0 or greater, the formation of high molecular weight products are favored. Also, when one employs a tetra-amine instead of a diamine, the formation of a higher molecular weight product is expected. While it is possible to describe the polymeric backbones useful in the practice of my invention directly in terms of their molecular weight, it is not particularly convenient to do so. I have found that it is more convenient to express the degree of condensation of the bis acrylamido compound and the polyamine in terms of the products' viscosity characteristics in aqueous solutions. In this manner, an arbitrary resin solids content of 33% has been chosen. Accordingly, the polymeric backbones that may be used in the practice of my invention exhibit a viscosity within the order of from about A to about T at 33% resin solids in water as measured at 25° C. on the Gardner-Holdt bubble viscosimeter scale. In terms of said standards, the preferred viscosity is within from about B to O.

Two techniques may be employed to obtain these polymeric backbones. In one manner the bis acrylamido compound is reacted with the polyamine in nearly equimolar or greater quantities, i. e., up to 3:1 respectively, until the reaction proceeds to a maximum desired degree as indicated by a viscosity not greater than about T of an aqueous solution containing 33% resin solids as measured at 25° C. on the Gardner-Holdt scale and then stabilizing the polymer by the addition of a secondary amine to terminate the reaction. By this technique it has been found that when the secondary amine is added to the polymerization mixture the secondary amine preferentially reacts with residual vinyl groupings remaining in the mixture and thereby inhibits further polymerization of the reaction product.

As an alternate and preferred procedure, a stable water-soluble material may be obtained by using a low enough ratio of the diacrylamido compound to the polyamine so that although the reaction proceeds to completion, the polymer remains soluble and possesses a viscosity of not greater than about T (Gardner-Holdt) at 33% resin solids in water. In following this latter procedure, it is contemplated that the amount of the bis acrylamido compound in relation to the polyamine is sufficient to link together all of the polyamine into a linear polymer which has a chain length not in excess of the desired maximum, which in viscosity terms is not greater than T when dissolved to the extent of 33% polymer in water.

Where it is desirable to short-stop the reaction by the use of a secondary amine, various types of secondary amines may be employed as for example, dimethylamine, diethylamine, diethanolamine, N-methylethanolamine, cyclohexylmethylamine, and aromatic secondary amines, such as monomethylaniline. Also, where one employs a secondary amine to short-stop the condensation reaction, an amount should be used which is at least sufficient to terminate further interreaction between the polyamine and the bis acrylamido compounds, or further polymerization of the vinyl component. Although the amount of secondary amine used for this purpose is not critical, generally an amount equivalent to 2.5 to 3 times the difference between the molar amount of bis acrylamido compound to polyamine and 0.80 is sufficient. For example, when one mol of alkylidene-bis-acrylamide per mol polyamine is reacted, the amount of secondary amine would be (1 less 0.8) times 2.5 or 0.5 mol of secondary amine.

The temperature at which the reaction between the bis acrylamido compound and the polyamine is carried out may be varied considerably, ranging from about 20° C. to about reflux temperature.

Where the ratio of bis acrylamido compound to polyamine employed is relatively low, i. e., one or less, it is preferred that the reaction temperature be in the order of from about 70 to 95° C. When employing low ratios of these respective reactants as indicated there is no danger that gelation will ensue, nor is there any likelihood that the desired maximum viscosity will be exceeded because of lack of control of the condensation reaction. However, when the ratio of bis acrylamido compound to polyamine is appreciably greater than one, it is preferred that the reaction temperature be in the order of from about 20 to 50° C. Operating within this temperature range permits one to periodically measure the extent of the condensation reaction by means of viscosity determinations and thereby affords an ample opportunity to make the timely addition of secondary amine in order to check the reaction.

Suitable diacrylamido compounds that may be used in the practice of my invention to secure the initial polymeric backbone are those bis acrylamido compounds having the general formula

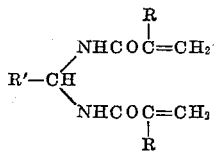

wherein R'—CH< is the hydrocarbon residue of an aldehyde and R is a member of the group consisting of hydrogen and alkyl radicals having 1 to 4 carbon atoms. These compounds are known and may be prepared for example, in the manner described in the L. A. Lundberg U. S. Patent 2,475,846.

In the compounds of this formula, the R'—CH< group may be derived as the hydrocarbon residue of formaldehyde, acetaldehyde, propionaldehyde, butyraldehyde, pentanal, caprylaldehyde, lauricaldehyde, crotonaldehyde, benzaldehyde, furfural, salicyl-aldehyde, cinnamic aldehyde, or the like. In other words, R' may be hydrogen, alkyl, alkenyl, aralkyl, aralkenyl, aryl, or heterocyclic. Instead of the formaldehyde, formaldehyde engendering compounds such as para-formaldehyde and hexamethylene-tetraamine may be employed to produce the various N,N'-methylene-bis acrylamido and N,N'-methylene-bismethacrylamido intermediates.

While all of the diacrylamido compounds mentioned hereinabove may be used singly or in combination with one another, it is preferred that the diacrylamido compound be either N,N'-methylene-bis acrylamide or N,N'-methylene-bis-methacrylamide.

The polyamines referred to above, which may be used to condense with the diacrylamido compounds to produce the initial polymeric backbone, preferably should contain a carbon to nitrogen atomic ratio of not greater than three. Suitable polyamines employed in the practice of my invention include various alkylenediamines as represented by 1,2-ethylenediamine, trimethylenediamine, 1,2-propylenediamine, and 1,2-, 1,3- and 1,4-butylenediamines. These alkylenediamines should contain at least 2, but preferably not more than 4, linear carbon atoms because longer alkylene groups may result in condensates having inadequate solubility in water. The alkylene groups may be substituted by non-ionic groups, but the alkylene polyamine, as a whole, should be water-soluble. As starting materials, there may equally well be employed the equivalent lower polyalkylene polyamines derived therefrom, such as diethylenetriamine, triethylenetetraamine, and tetraethylenepentamine, as well as the corresponding polypropylene polyalkylene polyamines such as tripropylenetetraamine of the formula

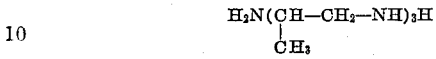

Another particularly suitable polyalkylene polyamine that may be employed in the practice of my invention is a compound known as 3,3'-iminobispropylamine of the formula

The alkylene polyamines may also carry amino alkyl groups is exemplified by the compound 3,3',3''-nitrilotripropylamine of the formula

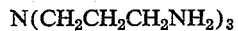

Other polyamines that can be used are oxybispropylamine, ethylenedioxypropylamine, trimethylenedioxypropylamine, and N-methyl-N,N bisaminopropylamine.

In general, the preferred polyamines are those which are essentially composed of the lower alkylene linkages such as —HNCH$_2$CH$_2$CH$_2$NH— or

since these polyamines are readily available, freely water-soluble and yield ultimate resins exhibiting optimum properties.

The second step in the process constituting my invention, consists of forming the complete salt of the polymeric backbones obtained in the condensation of a bis acrylamido compound and a polyamine, the preparation of same having been described hereinabove. In this step, a sufficient amount of a strong water-soluble, preferably inorganic, acid is added to the polymer solution of Step 1. The amount of acid which should be added to the solution is easily calculated by those skilled in the art from the number of the active amino groups present in the initial reactant. The inorganic acids that may be used to form salts of the polymer are those known to be suitable for neutralizing amines, and include hydrochloric, hydrobromic, hydroiodic, sulfuric, and the like. Inorganic acids such as formic, acetic and the like also may be used. By employing a sufficient amount of the acid, the complete polyamine salt is thus formed.

In the third principal step, the polyamine salt formed in Step 2 is converted to polyureido derivative. One way to achieve this is to react the polyamine salt with a water-soluble metal cyanate or water-soluble metal thiocyanate in aqueous solution. The alkali metal compounds, such as lithium, sodium, and potassium are preferred. Representative of cyanate and thiocyanate compounds that may be employed in my invention are lithium cyanate, sodium cyanate, potassium cyanate, sodium thiocyanate, potassium thiocyanate, and mixtures thereof. The amount of cyanate or thiocyanate used should be at least sufficient to react with about 80% of the amino nitrogen atoms of the polymeric backbone derived in the practice of Step 1 hereinabove discussed. In determining the amount of cyanate or thiocyanate to be employed, one takes in account only those nitrogen atoms associated with the polyamine employed in the preparation of the linear resinous backbone; in other words, the amount of nitrogen atoms in the polymer resulting from the use of the diacrylamido compound employed to prepare the base polymer should be disregarded. The use of an excess of cyanate or thiocyanate apparently has no deleterious effect. I, therefore, prefer to add 0.9 to about 1.5 mols of cyanate or thiocyanate per amino nitrogen atom of the base or polymeric backbone. This reaction is exothermic and is complete when the exotherm or exothermic heat of the reaction ceases. The reaction takes place between room temperature and the reflux temperature of the reaction mixture. Preferably, however, it is carried out between about 50° C. and about 80° C. The time required to complete Step 3 ranges from about 5 minutes to about 45 minutes, depending, quite obviously, on the temperature employed. This reaction does not cause any cross-linking of the polymeric backbone, and, therefore, there is little danger of gelation in this step.

The final step in the formation of the novel resinous compositions of my invention is to react formaldehyde with the reaction product obtained in Step 3. While it is preferred to react formaldehyde with the reaction mixture to form the final resinous composition, nevertheless, other compounds engendering formaldehyde such as paraformaldehyde, trioxane, and the like may be employed, if desired. The amount of formaldehyde to be employed is based on the mols of the ureido groups present in the reaction mixture, which in turn are based on the number of amino nitrogen atoms present in the backbone polymer. Thus, from about 1:1 to about 3:1, preferably 1:1 to 2:1, mols of formaldehyde per mol of the ureido groups are to be introduced into the reaction mixture. Reaction is then carried out at temperatures ranging from about 25° C. up to the reflux temperature of the mixture. This reaction is carried out at a pH that is neutral or slightly alkaline, preferably in the order from about 7 to 10. While the condensation reaction exemplified in this final step may take place at room temperature, it is preferred that elevated temperatures be employed, that is, at a temperature in the range from about 70° C. to the reflux temperature which will be in the proximity of 100° C. At elevated temperatures the reaction may be completed in this final step in a period of from about 10 to about 180 minutes, and preferably from about 30 to about 120 minutes.

The condensates of Step 4 constitute the final novel products of my invention and may be prepared for use by cooling and diluting to a desired resin solids content with water. The composition can also be dried by convenient means, for instance, spray-drying or tray-drying.

The aqueous solutions of these novel resinous products are cationic. In some instances, the solutions exhibit a colloidal haze, whereas in other instances, they appear completely clear, although they may be tinted straw-like in color.

In order that the present invention may be more completely understood, the following examples are set forth in which all parts are parts by weight unless otherwise indicated. These examples are set forth primarily for the purpose of illustration, and any specific enumeration in detail contained therein should not be interpreted as a limitation on the case, except as indicated in the appended claims.

*Example I*

Sixty-six parts of 3,3'-iminobispropylamine (0.5 mol) were added to a suitable reaction vessel equipped with a thermometer and stirrer. Thereupon, 270 parts of water and 69 parts (0.45 mol) of N,N'-methylenebisacrylamide were added to the reaction sphere. The reaction mixture was rapidly heated to 95° C. and held at this temperature with stirring for 15 minutes after which time the reaction between the polyamine and the bis acrylamide was substantially complete. The resinous syrup was cooled to approximately room temperature. The syrup contained 33% solids and had a viscosity of E on the Gardner-Holdt scale when measured at 25° C.

The polymer syrup thus formed (equivalent to 1.5 amino N atoms) was acidified with 156 parts of 37.5% hydrochloric acid so as to result in the reaction mixture having a pH of 1.5. To the thus-formed polymeric salt, 129 parts of potassium cyanate were added and reacted therewith at 75° C. for 10 minutes, during which time the exotherm had completely subsided. Thereupon, 243 parts of Formalin (37% aqueous formaldehyde) were introduced and the mixture condensed for 20 minutes at 75–80° C. Whereupon, the resultant syrup was cooled to room temperature. The final product was a clear, water-soluble, and slightly yellowish tinted resinous syrup containing an actual solid content of 37%.

*Example II*

Into a reaction vessel, equipped as in Example I, were charged 135 parts of an initial condensation product of 3,3'-iminobispropylamine and N,N'-methylene-bis acrylamide prepared in an identical manner as employed in Example I. This syrup was acidified with hydrochloric acid in a manner similar to that employed in Example I. There was charged to the thus-formed salt 86 parts of potassium cyanate. The mixture was allowed to react for 30 minutes at 60° C. At the end of the reaction time, 243 parts of 37% aqueous formaldehyde solution were added. The mixture was reacted at room temperature for 24 hours. This clear resinous syrup was found to be an excellent anchoring agent for coating nitrocellulose lacquer and cellophane.

*Example III*

This example illustrates the use of a secondary amine to shortstop the copolymerization reaction between the bis acrylamide and polyamine. Into a suitable reaction vessel, equipped with a stirrer and thermometer, are charged 231 parts methylene bis acrylamide (1.5 mol), 146 parts triethylene tetraamine (1.0 mol), and 554.5 parts water. The reaction is carried out at 25–30° C. with stirring. The viscosity of the reaction mixture is ascertained periodically by withdrawing small samples of the reaction medium and diluting with water to a solids content of 33%. The reaction mixture was held within the temperature range indicated for 39 minutes, at which time, the resinous syrup had advanced to a viscosity of T when measured at 33% solids. At this point, a chain terminator consisting of diethylamine in the amount of 153.5 parts (2.1 mol) was added to the reaction mixture. Following the addition of the diethylamine, there resulted a stabilized resinous syrup having a viscosity of T as measured on the Gardner-Holdt scale at 25° C. A polymeric salt thereof was made in the manner of Example I. Thereupon, 275 parts of potassium cyanate were added to the reaction mixture and reacted therewith at 50° C. for 50 minutes. Following the formation of the extralinear polyurea, 350 parts of Formalin (37% aqueous formaldehyde) were condensed therewith at 70–80° C. for 30 minutes. The finished product was completely water-soluble, straw yellow in color at 30% resin solids in water.

*Example IV*

This example, like Example III, illustrates the use of a chain terminator to shortstop the polymerization involving the formation of the linear polymeric backbone. It further illustrates the use of a higher ratio of diacrylamido compounds to the polyamine. Into a suitable reaction vessel, equipped as in Example I, was charged 308.2 parts (2.0 mol) of methylene bis acrylamide, 146 parts (1 mol) of triethylene tetraamine, and 680.5 parts water. The reaction was conducted with stirring within the temperature range of 25–30° C. After a reaction time of 55 minutes, 262.8 parts diethylamine (3.6 mol) were added to the reaction medium. Thereupon, a stabilized resinous syrup was obtained, having a viscosity of J when measured at 25° C. and at 33% resin solids on the Gardner-Holdt scale. A complete salt was made of the polymeric condensate in the manner illustrated in Example I. In forming the extralinear polyurea derivative of the said salt, 344 parts of potassium cyanate were reacted therewith for 10 minutes at 75° C. The polyurea was then condensed with 350 parts of Formalin (37% aqueous formaldehyde) for 15 minutes at 70° C. to yield the final resinous product.

*Example V*

Example I was repeated in all details except 82 parts (0.45 mol) of N,N'-methylene bis methacrylamide were substituted for the N,N'-methylene bis acrylamide component thereof. The initial condensation product of the polyamine and N,N'-methylene bis methacrylamide had a viscosity of E at 33% solids when measured on the Gardner-Holdt scale at 25° C. The completed formaldehyde condensate was completely soluble in water and the aqueous solution thereof exhibited cationic characteristics.

Pieces of cotton percale were treated with each of the final products of Examples III, IV and V. In each instance the impregnation procedure was controlled so that there was a 5% by weight pickup of solid resin. After curing the so-treated cotton pieces at 200° F. for 10 minutes, excellent shrinkage resistance of the resin treated cloth was noted.

I claim:

1. A process for preparing a resinous composition comprising reacting in an aqueous medium (1) a water-soluble polyamine having a carbon to nitrogen atomic ratio not exceeding three and (2) a diacrylamido compound having the formula

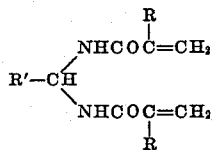

wherein R'—CH< is a hydrocarbon residue of an aldehyde and R is a member of the group consisting of hydrogen and alkyl radicals having one to four carbon atoms, in a mol ratio of (1) to (2) of 0.5:1 to 3:1, respectively, at a temperature ranging from about 25° C. to reflux until the reaction product of (1) with (2) has a viscosity within the range of from about A to T at 33% resin solids measured at 25° C. on the Gardner-Holdt scale, adding a sufficient amount of an acid to form the substantially complete salt of the said reaction product of (1) with (2), thereupon reacting said salt with (3) an alkaline metal cyanate in an amount of from about 0.9 to 1.5 mols per atom of nitrogen in said salt until the exotherm ceases, thereupon reacting the said composite reaction product of (1), (2) and (3) at a pH from about 7 to 10 with (4) formaldehyde on the basis of from one to three mols per ureido group of said composite reaction product.

2. A process for preparing a resinous composition comprising reacting in an aqueous medium (1) a water-soluble polyamine having a carbon to nitrogen atomic ratio not exceeding three and (2) a diacrylamido compound having the formula

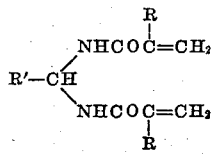

wherein R'—CH< is a hydrocarbon residue of an aldehyde and R is a member of the group consisting of hydrogen and alkyl radicals having one to four carbon atoms, in a mol ratio of (1) to (2) of 0.7:1 to 2:1, respectively, at a temperature ranging from about 25° C. to reflux until the reaction product of (1) with (2) has a viscosity within the range of from about A to T at 33% resin solids measured at 25° C. on the Gardner-Holdt scale, adding a sufficient amount of an acid to form the substantially complete salt of the said reaction product of (1) with (2), thereupon reacting said salt with (3) an alkaline metal cyanate in an amount of from about 0.9 to 1.5 mols per atom of nitrogen in said salt until the exotherm ceases, thereupon reacting the said composite reaction product of (1), (2) and (3) at a pH from about 7 to 10 with (4) formaldehyde on the basis of from one to two mols per ureido group of said composite reaction product.

3. A process for preparing a resinous composition comprising reacting in an aqueous medium (1) a water-soluble polyamine having a carbon to nitrogen atomic ratio not exceeding three and (2) bis acrylamide, in a mol ratio of (1) to (2) of 0.5:1 to 3:1, respectively, at a temperature ranging from about 25° C. to reflux until the reaction product of (1) with (2) has a viscosity within the range of from about A to T at 33% resin solids measured at 25° C. on the Gardner-Holdt scale, adding a sufficient amount of an acid to form the substantially complete salt of the said reaction product of (1) with (2), thereupon reacting said salt with (3) an alkaline metal cyanate in an amount of from about 0.9 to 1.5 mols per atom of nitrogen in said salt until the exotherm ceases, thereupon reacting the said composite reaction product of (1), (2) and (3) at a pH from about 7 to 10 with (4) formaldehyde on the basis of from one to three mols per ureido group of said composite reaction product.

4. A process for preparing a resinous composition comprising reacting in an aqueous medium (1) a water-soluble polyamine having a carbon to nitrogen atomic ratio not exceeding three and (2) bis acrylamide, in a mol ratio of (1) to (2) of 0.7:1 to 2:1, respectively, at a temperature ranging from about 25° C. to reflux until the reaction product of (1) with (2) has a viscosity within the range of from about A to T at 33% resin solids measured at 25° C. on the Gardner-Holdt scale, adding a sufficient amount of an acid to form the substantially complete salt of the said reaction product of (1) with (2), thereupon reacting said salt with (3) potassium cyanate in an amount from about 0.9 to 1.5 mols per atom of nitrogen in said salt until the exotherm ceases, thereupon reacting the said composite reaction product of (1), (2) and (3) at a pH from about 7 to 10 with (4) formaldehyde on the basis of from one to two mols per ureido group of said composite reaction product.

5. The product prepared according to claim 4.

6. A process for preparing a resinous composition comprising reacting in an aqueous medium (1) a water-soluble polyamine having a carbon to nitrogen atomic ratio not exceeding three and (2) bis methacrylamide, in a mol ratio of (1) to (2) of 0.5:1 to 3:1, respectively, at a temperature ranging from about 25° C. to reflux until the reaction product of (1) with (2) has a viscosity within the range of from about A to T at 33% resin solids measured at 25° C. on the Gardner-Holdt scale, adding a sufficient amount of an acid to form the substantially complete salt of the said reaction product of (1) with (2), thereupon reacting said salt with (3) an alkaline metal cyanate in an amount of from about 0.9 to 1.5 mols per atom of nitrogen in said salt until the exotherm ceases, thereupon reacting the said composite reaction product of (1), (2) and (3) at a pH from about 7 to 10 with (4) formaldehyde on the basis of from one to three mols per ureido group of said composite reaction product.

7. A process for preparing a resinous composition comprising reacting in an aqueous medium (1) a water-soluble polyamine having a carbon to nitrogen atomic ratio not exceeding three and (2) bis methacrylamide, in a mol ratio of (1) to (2) of 0.7:1 to 2:1, respectively, at a temperature ranging from about 25° C. to reflux until the reaction product of (1) with (2) has a viscosity within the range of from about A to T at 33% resin solids measured at 25° C. on the Gardner-Holdt scale, adding a sufficient amount of an acid to form the substantially complete salt of the said reaction product of (1) with (2), thereupon reacting said salt with (3) potassium cyanate in an amount of from about 0.9 to 1.5 mols per atom of nitrogen in said salt until the exotherm ceases, thereupon reacting the said composite reaction product of (1), (2) and (3) at a pH from about 7 to 10 with (4) formaldehyde on the basis of from one to two mols per ureido group of said composite reaction product.

8. The product prepared according to claim 7.

No references cited.